Figure 1:
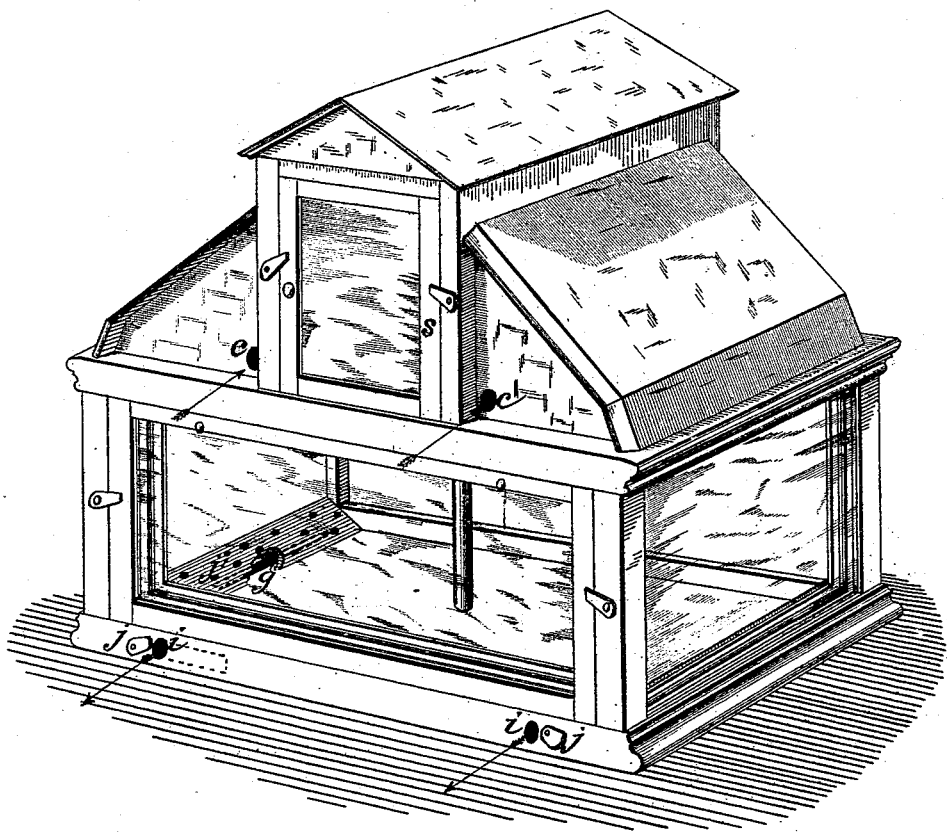

2 Sheets—Sheet 1.

J. HAGMANN & F. SAUER.
Refrigerating Show-Case.

No. 226,169  Patented April 6, 1880.

2 Sheets—Sheet 2.

J. HAGMANN & F. SAUER.
Refrigerating Show-Case.

No. 226,169. Patented April 6, 1880.

Attest,
W. H. H. Knight
Floyd Norris

Joseph Hagmann
Francis Sauer
Inventors:
by Johnson & Johnson
Attys.

N. PETERS, PHOTO-LITHOGRAPHER, WASHINGTON, D. C.

UNITED STATES PATENT OFFICE.

JOSEPH HAGMANN AND FRANCIS SAUER, OF WASHINGTON, D. C.

REFRIGERATING SHOW-CASE.

SPECIFICATION forming part of Letters Patent No. 226,169, dated April 6, 1880.

Application filed July 28, 1879.

*To all whom it may concern:*

Be it known that we, JOSEPH HAGMANN and FRANCIS SAUER, of Washington, in the District of Columbia, have jointly invented certain new and useful Improvements in Refrigerating Show-Cases; and we do hereby declare that the following is a full, clear, and exact description of the invention, which will enable others skilled in the art to which it appertains to make and use the same, reference being had to the accompanying drawings, and to the letters of reference marked thereon, which form a part of this specification.

Our refrigerator is more especially adapted for preserving and displaying viands in restaurants; but the improvements therein are applicable to refrigerators generally, and embrace a construction for effecting a circulation of fresh air and maintaining thereby a more perfect and constant ventilation of the preserving-chamber without increasing the temperature within said chamber or the waste of ice. The drip-pan and waste-pipe are of a construction to avoid surface-sweating and the dripping of water within the provision-chamber.

In refrigerators where a variety of cooked and raw articles of food are kept the experience is that there is more or less bad smell or odor which impregnates the several articles. The construction by which we obtain a circulation of fresh air avoids this objection; and it consists, chiefly, in providing receiving and distributing air-chambers substantially closed and communicating with the outer air by apertures in one or both sides of the casing and arranged within circulating air-chambers on the opposite sides of the ice-box, which circulating-chambers, in connection with outlets in the bottom of the refrigerator, will cause the air entering the distributing air-chambers to pass therefrom by draft into the circulating air-chambers and the ice-box over and in contact with the ice, and descending into the provision-chamber gives an outflow of the foul heavy air through the bottom openings, thus maintaining a constant cold temperature of dry air, free from odor, and preserving the articles in their natural flavor.

The manner in which this draft of fresh air is produced and maintained through the refrigerator without increasing the temperature is due to the arrangement of the nearly-closed receiving and distributing air-chambers within the circulating air-chambers, whereby the temperature of the warm incoming air is materially reduced before it enters the circulating-chambers, from which it passes in contact with zinc deflectors on the interior opposite sides and at the top of the ice-box, and is prevented thereby from direct impingement upon the ice.

For the purpose of giving a thorough view of the ice-box, its ends are provided with double glass, one of which, at one end, may be colored, producing the effect of a colored block of ice, and with a gas-jet opposite the colored glass the effect is most handsome and pleasing.

Figure 2:
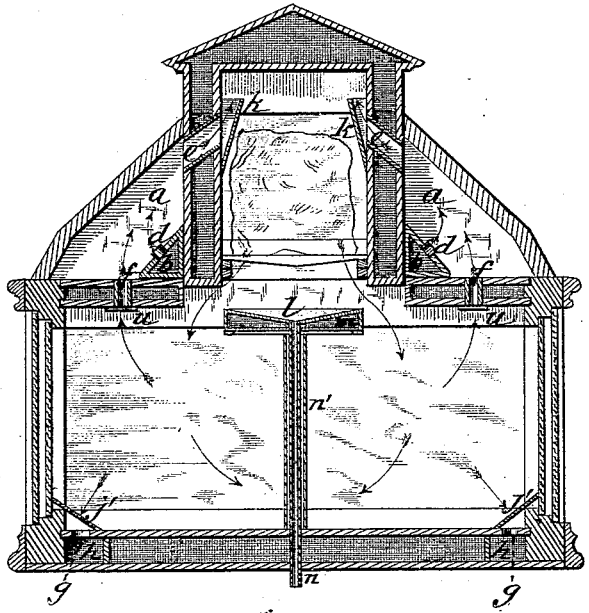
Figure 3:
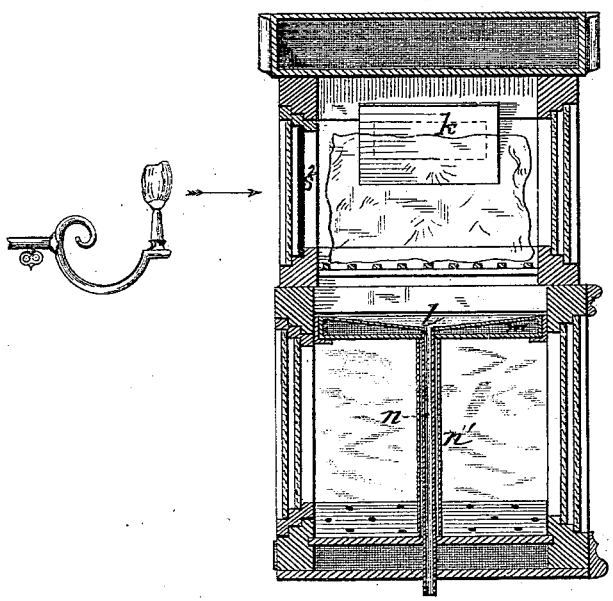

Referring to the accompanying drawings, Figure 1 represents a view, in perspective, looking from the rear, of a refrigerating show-case embracing our invention; Fig. 2, a vertical longitudinal section thereof; Fig. 3, a cross-section, and Fig. 4 a section of the drip-pan.

The refrigerating-chamber is formed with double glass sides, which may be made in sections, and it has a double bottom with a lining of thick straw-board, paper, or other suitable non-conductor. The ice-box is placed centrally upon the oblong casing of this chamber and opens into it, being provided with a grating, upon which the block of ice is placed. The sides and top of the ice-box are lined with thick straw paper or other non-conductor, and at each side a sloping (or other form) casing forms a circulating air-chamber, *a*, at the lower inner corner of which and joining the casing of the ice-box a chamber, *b*, is formed, extending the width of the sloping casing, and provided with a perforation, *c*, at one or both sides of said casing, as shown in Fig. 1, through which the outer air has a draft into these chambers, and from which the fresh air is distributed by inner slots or perforations, *d*, into the circulating-chambers, which, by means of openings *e*, communicate with the ice-box at or near its top, and descending pass out on both sides of the drip-pan into the provision-chamber, from which the heavy foul air is carried out through the bottom inlets, whereby a circulation of fresh cold air is effected and maintained. This outward draft to carry out the bad smell from the refrigerating-chamber is effected by slots or openings $g$ in the bottom and near each end of the refrigerating-chamber, which open to the outer air by the double bottom passage, $h$, and slots or perforations $i$ at the rear side of the base. These outlets may be provided with slide or pivot valves $j$, to regulate or close the outward draft, or be always open.

The bottom slots or openings, $g$, are provided with sloping perforated covers $j'$, so as to give a free outward draft and ventilation, and prevent the entrance of bugs and of water getting into the bottom passages, $h$, in cleaning out the refrigerator. The ice-box has metal shields $k$ placed on the inner sides over the openings $e\ e$, so as to deflect the air up over the ice from the circulating-chambers.

A drip-pan, $l$, having an air bottom space, $m$, is placed below the grating to receive and conduct the drip away by means of a vertical or other pipe, $n$, which has a jacket, $n'$, leaving an air-space around the drip-tube, which, in connection with the air-space or double bottom of the drip-pan, keeps the drip-surface dry and entirely free from sweat.

The ice-box has double glass at each end, giving a through view, with an end door, $s$, for placing and removing the ice. The door is preferably at the back, and one of its double glasses, $s^2$, is colored red or blue to give the block of ice and its chamber a brilliant appearance, which is greatly heightened and rendered attractive at night by the aid of a gas-jet placed opposite the colored glass.

The chambers $b$, in distributing the fresh air through the inner perforations, necessarily hold it a little and cool it before it passes out into the circulating-chambers $a$, from which it passes against the cold-deflectors of the ice-box, and thence over the ice down into the provision-chamber, and, circulating therein, will at the same time circulate through one or more perforations, $f$, in the double bottoms of the circulating-chambers, and in this circulation the foul air passes out through the bottom outlets, keeping the lower chamber sweet and dry.

Figure 4:
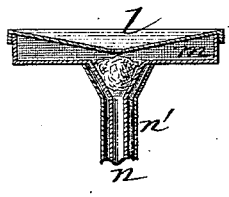

The drip-pipe may terminate in a seal or be provided with a trap to prevent the entrance of warm air; or a sponge may be placed in the chamber of the drip-pan for this purpose, as shown in Fig. 4.

One of the glass sides of the refrigerating-chamber may be hinged for access.

The perforations in the bottoms of the circulating-chambers may be provided with valves $u$ to cut off such circulation and direct it to the bottom outlets entirely.

One or more ice-boxes and their contiguous chambers may be used, according to the length of the refrigerating-chamber and the use for which it may be designed.

This construction not only gives a proper preserving temperature, but avoids the bad odor from the articles of food, and prevents all sweating of the drip-surface, which objections exist to a greater or less extent in this class of refrigerators in use.

The inlet draft-opening $c$ may be provided with registers by which to regulate the draft.

It is especially the case in this class of refrigerators that the air in the provision-chamber cannot be displaced by top ventilation, because it is rendered, by the vapors from the different articles of food, too heavy to rise; and it was only after experiment that we could free this chamber of the bad smell by providing means by which the fresh air from the ice-box will cause the foul air to pass out at the bottom, where it collects, and by this means keep the chamber ventilated.

Double glass doors have been used in refrigerators, and various plans have been devised for effecting a circulation of the air through the ice-box, and among which side air-chambers have been used, communicating with the outer air and with the provision-chamber through the ice-box, and in connection with which an outlet is provided at the top of the provision-chamber and above the air-receiving ice-box chambers.

We are aware that in some refrigerators the drip-pan has been jacketed, and that in others the drip-pipe has been jacketed; but these things, separately, cannot render the entire drip-surface non-sweating, and for this purpose we unite these two separate things—that is, we jacket both drip-pan and drip-pipe—in the same refrigerating-chamber, and thereby avoid the sweating and dropping of water from the drip-pan and its drip-pipe, and thus prevent the absorption of moisture by the air.

We claim—

1. In a refrigerating show-case, the bottom of the provision-chamber, having outlets $g\ g$ at or near each end, in combination with an ice-box having a circulating air-chamber, $a$, on each side, and an air-receiving chamber, $b$, within said side chambers, $a\ a$, and on the outer sides of the double walls of said ice-box, whereby the heavy foul air will be forced out the bottom outlets, as set forth.

2. The combination, with the bottom outlet-perforations, $g\ g$, the bottom passages, $h\ h$, and valved side openings, $i\ i$, of the perforated shields or covers $j\ j$, substantially as and for the purpose herein set forth.

3. The metal deflectors $k\ k$ on the opposite inner sides of the ice-box, in combination with the side circulating-chambers, $a\ a$, the air-passages $e\ e$ and $f\ f$, and the receiving and distributing chambers $b\ b$, substantially as and for the purpose herein set forth.

4. In combination with the ice-box of a refrigerator, the drip-pan $l$ and its waste-pipe $n$, said drip-pan being provided with a double or false bottom, forming the air-space $m$, and the pipe $n$ being provided with the jacket $n'$, whereby sweating and dropping of water within the provision-chamber is avoided, substantially as described.

5. A refrigerating show-case consisting of a refrigerating provision-chamber surmounted by a communicating ice-box, the air receiving and distributing chambers $b\,b, c\,c, d\,d$, arranged within the circulating side air-chambers, $a\,a$, the metal deflectors in the ice-box, the chambered and jacketed drip pan and tube, and the bottom valved outlets, $g\,g, i\,i$, provided with the perforated covers $jj$, all constructed for use substantially as herein set forth.

In testimony that we claim the foregoing we have hereto affixed our signatures in the presence of two witnesses.

JOSEPH HAGMANN.
FRANCIS SAUER.

Witnesses:
A. E. H. JOHNSON,
J. W. HAMILTON JOHNSON.